United States Patent
Vilkomerson et al.

[11] 3,907,407
[45] Sept. 23, 1975

[54] ELASTIC LIGHT-SCATTERING MODULATOR DEVICE

[75] Inventors: David Herman Raphael Vilkomerson, Princeton; Reuben Saul Mezrich, Rocky Hill, both of N.J.

[73] Assignee: RCA Corporation, New York, N.Y.

[22] Filed: Oct. 29, 1973

[21] Appl. No.: 410,565

[52] U.S. Cl. .................................................. 350/161
[51] Int. Cl. ................................................ G02f 1/28
[58] Field of Search ............................. 350/161 DM

[56] References Cited
UNITED STATES PATENTS

| | | |
|---|---|---|
| 3,196,008 | 7/1965 | Mihajlov et al. .............. 350/161 X |
| 3,463,572 | 8/1969 | Preston ............................ 350/161 |
| 3,796,480 | 3/1974 | Preston et al. ................. 350/161 |

Primary Examiner—John K. Corbin
Assistant Examiner—Paul K. Godwin
Attorney, Agent, or Firm—Glenn H. Bruestle; Birgit E. Morris

[57] ABSTRACT

An electronic light valve comprising a layer of an elastomer between two electrodes. The elastomer is compressed by application of an electric field across it but it resists further compression when the electric field is above a certain threshold. When an electric field higher than the threshold is applied across the elastomer layer, the layer becomes rippled and takes on a frosted appearance which disappears when the electric field is lowered below the threshold. If the electrodes and elastomer layer are light-transmitting, the device can be used as a transmitting light valve, otherwise it operates by reflecting light.

8 Claims, 3 Drawing Figures

ELASTIC LIGHT-SCATTERING MODULATOR DEVICE

The invention described herein was made in the performance of work under a NASA contract and is subject to the provisions of Section 305 of the National Aeronautics and Space Act of 1958, Public Law 85-568 (72 Stat. 435; 42 U. S. C. 2457).

BACKGROUND OF THE INVENTION

Applications such as alpha-numeric displays in computers, watch dials, advertising displays, and other apparatus, utilize light valves to modulate transmitted or reflected light to portray information.

SUMMARY OF INVENTION

The present invention is a light valve which employs an elastomer as the active material. The device also includes electrodes for applying an electric field across the elastomer, the field being of such magnitude that the elastomer is compressed to an extent that it resists further compression. The device has rapid response and uses no current except during the actual switching operation; therefore it draws little total power. The device is also simple and economical to make.

THE DRAWING

DESCRIPTION OF PREFERRED EMBODIMENT

Figure 1:
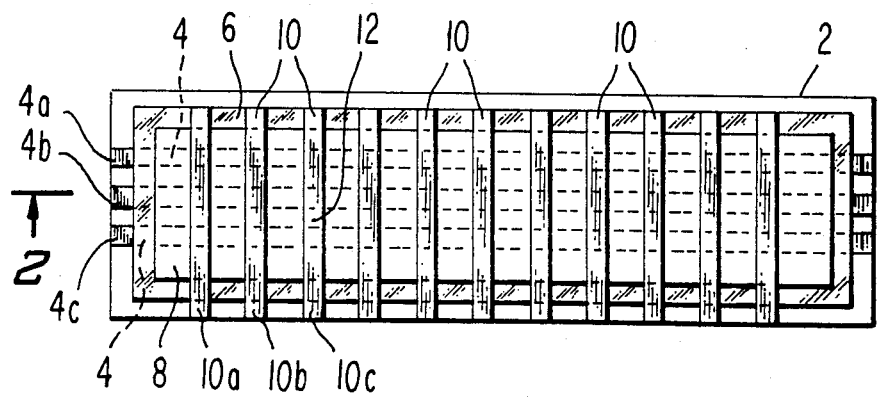
FIG. 1 is a plan view illustrating one embodiment of a device in accordance with the present invention.
Figure 2:
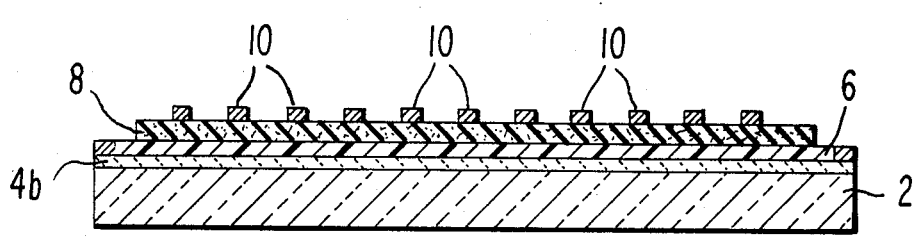
FIG. 2 is a section view taken along the line 2—2 of FIG. 1.
Figure 3:
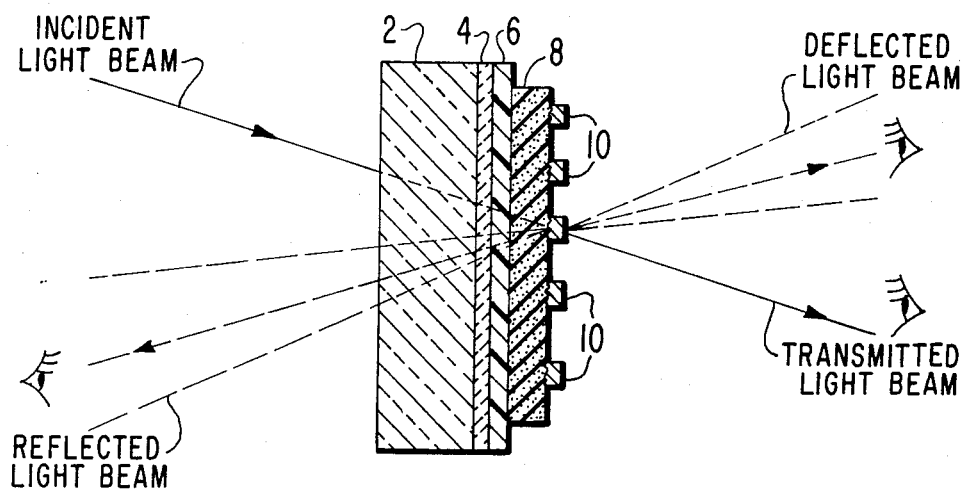
FIG. 3 is a sectional view of a light valve of the invention after activation.

In one preferred embodiment, the novel light valve includes a glass substrate plate 2 having on one of its surfaces a plurality of stripes 4, 2 mm wide, of a transparent conductive oxide such as $In_2O_3$. An example of the oxide is "Nesatron" made and marketed by Pittsburgh Plate Glass Co. Although only 3 such stripes have been illustrated in the drawing, any number of stripes can be used. Also, the entire surface of the substrate can be used. Also, the entire surface of the substrate can be coated with a transparent conductive film. If only the light-reflecting properties of the device are to be utilized, the conducting stripes 4 (or continuous film) may be made of an opaque conducting material such as gold, nickel or copper. Also, instead of a film 4, the substrate 2 may be of conducting material. If light transmissive properties of the device are to be utilized, the conducting stripes or film are made of transparent material.

In a preferred embodiment of the device, a protective insulating film 6 is deposited over the conductive stripes or film 4. The film 6 is to give added protection against arcing in the completed device. The film 6 may comprise a poly-n-vinyl carbazole synthetic resin having a thickness of about 1 micron. This film should be kept to the minimum thickness that will give the desired protection, since lower operating voltages of the device are associated with thinner films.

On top of the protective insulating film 6 is a film 8 of an elastomer. Elastomers resist further compression when an electric field above a certain threshold is applied across them. Above the threshold there may still be some further compression but the rate is so low that rippling of the film occurs. An example of a material suitable for the film 8 is RTV 602 which is a silicone rubber that vulcanizes at room temperature. This rubber is made and marketed by the General Electric Co. To reduce the threshold electric field at which the material resists further compression, there is preferably included in it about 1% by weight of a very fine grained silica (about 200 A spherical particles, made and marketed by Cabot, Inc., Boston, Mass. under the trade name "Cab-O-Sil"). One way to make the film is to add 1.5 g SRC 05 (catalyst marketed by the General Electric Co.) to 19.5 g RTV 602, dissolved in 100 ml of cyclohexane and blend in about 1% by weight of the Cab-O-Sil. This composition may then be applied by dip-coating on top of the film 6 to a thickness of about 0.5 to 5.0 microns.

Almost any elastomer can be used for the film 8, such as polysulfide rubbers, butadiene-styrene copolymers, polychloroprenebutadiene-acrylonitrile copolymers, isobutylene-diofin copolymers, and the like. The particles used to decrease the compressibility of the elastomer can be any shape except plates. Particle size should be less than the wavelength of the light which is to be transmitted or reflected.

On top of the elastomer film 8 is a series of stripes 10 of an electrically conducting material such as gold. The stripes may be deposited by evaporation. They are disposed at right angles to the conductive stripes 4 on the substrate. The thickness of the stripes 10 may be about 200 A, for example, and their width may be any desired dimension. In an experimental embodiment, the width of these stripes was 2 mm. The stripes 10 must be of a material and of a thickness such that the stripes are highly flexible.

The embodiment of the device which has been described may be operated to function using reflected light. The device operates on the principle that if a sufficiently strong electric field above a certain threshold potential is applied uniformly across a particular area of the elastomer film 8, it will, at first, be uniformly compressed by surface charges. During this stage, the elastomer does not undergo any change in appearance. However, when the force due to surface charge is balanced by surface tension forces of the elastomer, there can be so little further reduction in the average thickness of the film that the dominant deformation of the film then takes the form of a sinesoidal variation of thickness. The surface of the film becomes rippled and the appearance is frosty. The metal electrode stripe 10 on top of the rippled film portion also takes on a frosted appearance. When the electric field is dropped below the threshold potential, the ripples abruptly disappear.

In the device illustrated, if one of the stripes 4a, 4b or 4c is connected to one pole of a dc voltage source of sufficient magnitude, and one of the stripes 10a, 10b, 10c, etc. is connected to the opposite pole of the voltage source, the portion of the film 8 at the crossover area of the two stripes will become frosted in appearance by reflected light. For example, if stripes 4b and 10c are connected to opposite poles of a dc voltage source (not shown) the area 12 at the crossing of the two stripes will become frosted in appearance and will thus have an appearance which contrasts with that of the surrounding film.

In the embodiment which has been described, 200 v. is needed to cause a beginning of the frosted appearance where the thickness of the elastomer is about 1.5 microns. A maximum of frosting appears at about 250 volts. When an incident beam of light is directed onto the top of the device, the form of the scattered light is a halo of light around the reflected beam with the angle of the halo inversely proportional to twice the thickness of the elastomer film.

In the present embodiment, turn-on time, that is, time for light to be scattered away from the normally reflected beam, is one millisecond at the device voltages specified. Turn-off time is also one millisecond. The device may be cycled at least millions of times without noticeable degradation.

Since the device is an insulator, no current flows after it is either turned on or off. Current flows only when the device is being switched.

The device may be switched by application of an ac potential as well as a dc potential. Threshold potential varies with the compressibility of the elastomer film as well as with the film thickness.

It will be apparent that with many stripes in the electrodes 4 and 10 and means to select a complex pattern of stripes to be energized at any one time, any desired pattern of cross-over areas can be changed in appearance at the same time, thus creating a display figure. If the bottom electrode 4 is a continuous film, (or other continuous conducting surface) the display figure is limited to the variations possible in the top electrode 10.

We claim:

1. A device for modulating an incident light beam comprising:

a substrate including a first electrode, a film of an elastomer over said first electrode, said elastomer being one whichh compresses when subjected to an electric field up to a certain threshold value, resists further compression and becomes rippled when said field is above said threshold value and returns to its original condition when said field is removed, and a second highly flexible electrode over said elastomer film such that, when an electric field is applied to said electrodes above said threshold value, said elastomer film ripples, thereby deflecting said incident light beam.

2. A device according to claim 1 additionally including an insulating film between said first electrode and said elastomer film.

3. A device according to claim 1 in which said elastomer film comprises a film of a synthetic rubber containing particles of an inert filler.

4. A device according to claim 3 in which said filler comprises spherical particles of silica.

5. A device according to claim 1 in which said substrate, said film and said electrodes are light-transmitting.

6. A device according to claim 1 in which said first electrode comprises a pattern of transparent conductors.

7. A device according to claim 6 in which said second electrode comprises a pattern of metal stripes.

8. A device according to claim 1 in which said elastomer is a silicone rubber.

* * * * *